(12) United States Patent
Lagree et al.

(10) Patent No.: US 10,965,110 B2
(45) Date of Patent: Mar. 30, 2021

(54) SUPPORT APPARATUS USABLE WITH ELECTRICAL ENCLOSURE

(71) Applicant: EATON INTELLIGENT POWER LIMITED, Dublin (IE)

(72) Inventors: James L. Lagree, Robinson Township, PA (US); Bruce R. Terhorst, Burgettstown, PA (US); Jon Hymel, Robinson Township, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 47 days.

(21) Appl. No.: 16/000,026

(22) Filed: Jun. 5, 2018

(65) Prior Publication Data
US 2018/0287359 A1    Oct. 4, 2018

Related U.S. Application Data

(62) Division of application No. 13/905,424, filed on May 30, 2013, now abandoned.

(51) Int. Cl.
| | |
|---|---|
| *H02G 3/14* | (2006.01) |
| *A47B 81/00* | (2006.01) |
| *F16B 2/22* | (2006.01) |
| *F16B 5/06* | (2006.01) |
| *A47B 47/02* | (2006.01) |

(52) U.S. Cl.
CPC .............. *H02G 3/14* (2013.01); *A47B 81/00* (2013.01); *A47B 47/025* (2013.01); *F16B 2/22* (2013.01); *F16B 5/0635* (2013.01); *Y10T 24/44991* (2015.01)

(58) Field of Classification Search
CPC ........ H02G 3/14; A47B 81/00; A47B 47/005; F16B 2/22; F16B 5/0635
See application file for complete search history.

(56) References Cited

U.S. PATENT DOCUMENTS

| | | | | |
|---|---|---|---|---|
| 2,459,953 | A | * | 1/1949 | Mills ....................... F16B 2/243 403/9 |
| 2,651,483 | A | * | 9/1953 | Ritchie .................... B41J 29/04 248/680 |

(Continued)

OTHER PUBLICATIONS

Canadian Intellectual Property Office, "OfficeAction"for corresponding CA Patent Application No. 2,851,736, ated Jan. 7, 2021, 5 pages.

*Primary Examiner* — Daniel J Rohrhoff
(74) *Attorney, Agent, or Firm* — Eckert Seamans Cherin & Mellott, LLC

(57) ABSTRACT

A support apparatus is usable with an electrical enclosure to provide support to retain a cover portion of the electrical enclosure in proximity to a cabinet portion of the electrical enclosure. The support apparatus includes a shank having a hook-shaped retention element situated at an end thereof that is configured to provide vertical support to the cover portion. The support apparatus can further include a second hook-shaped retention element at an opposite end of the shank that is configured to rest upon an upturned lip of the cabinet portion, or the shank can potentially be affixed to the cabinet portion. Slots can additionally be provided in the cabinet portion, the cover portion, or both to additionally provide horizontal alignment of the cover portion with the cabinet portion.

2 Claims, 15 Drawing Sheets

(56) References Cited

U.S. PATENT DOCUMENTS

| | | | | | |
|---|---|---|---|---|---|
| 2,918,712 | A | * | 12/1959 | Fernberg | F16B 5/121 |
| | | | | | 312/352 |
| 3,279,729 | A | * | 10/1966 | Buttriss | H01R 9/16 |
| | | | | | 248/27.3 |
| 3,566,194 | A | * | 2/1971 | Gryctko | H02B 1/056 |
| | | | | | 361/652 |
| 3,618,804 | A | * | 11/1971 | Krause | H02B 1/40 |
| | | | | | 220/3.8 |
| 3,858,370 | A | * | 1/1975 | Halstead | F16B 2/241 |
| | | | | | 312/352 |
| 4,103,860 | A | * | 8/1978 | Haas | A47G 1/17 |
| | | | | | 224/312 |
| 5,072,848 | A | * | 12/1991 | Pipis | H02G 3/14 |
| | | | | | 174/66 |
| 5,333,857 | A | | 8/1994 | Lallemand | |
| 6,327,758 | B1 | * | 12/2001 | Petrakis | E04B 9/006 |
| | | | | | 24/293 |
| 7,049,516 | B1 | * | 5/2006 | Haag | H02B 1/38 |
| | | | | | 174/481 |
| 7,688,573 | B2 | | 3/2010 | Ranta | |
| 8,944,044 | B2 | * | 2/2015 | Buck | F24C 15/108 |
| | | | | | 126/214 A |
| 2016/0375840 | A1 | * | 12/2016 | Dickinson | B60R 13/02 |
| | | | | | 24/295 |
| 2019/0135148 | A1 | * | 5/2019 | Dumler | F16B 2/245 |

\* cited by examiner

SUPPORT APPARATUS USABLE WITH ELECTRICAL ENCLOSURE

CROSS REFERENCE TO RELATED APPLICATION

The instant application claims priority from U.S. patent application Ser. No. 13/905,424 filed May 30, 2013, the disclosures of which are incorporated herein by reference.

BACKGROUND

Field

The disclosed and claimed concept relates generally to electrical switching equipment and, more particularly, to a support apparatus usable to support a cover portion of an electrical enclosure in proximity with a cabinet portion of the electrical enclosure.

Related Art

Numerous types of electrical switchgear are known in the relevant art. In certain applications, one or more line conductors are connected with circuit interrupters that are, in turn, connected with various loads. In order to limit access by people, animals, and the like to the exposed portions of the line and load conductors and the circuit interrupters, an electrical enclosure such as a load center, a switchgear panel, or the like is employed. Such electrical enclosures typically include a box-shaped cabinet portion to which the circuit interrupters are mounted and which has knockouts on one or more of its sides in order to receive the line and load conductors therethrough and into electrical connection with the circuit interrupters. Such an electrical enclosure typically also includes a cover portion that covers the interior regions of the cabinet portion and that encloses within the interior region the exposed portions of the line and load conductors and their connections with the circuit interrupters. After installation of the cover portion, typically only the operating handles of the circuit interrupters can be accessed without removing the cover portion from the enclosure portion.

While such electrical enclosures have been generally effective for their intended purposes, they have not been without limitation. For example, depending upon the current carrying capability of the electrical enclosure and the quantity of circuit interrupters the electrical enclosure is intended to accommodate, the electrical enclosure can be relatively tall and the cover portion can be likewise tall and relatively heavy and difficult for a technician to maneuver. Such electrical enclosures typically include a set of holes in the cover portion that are alignable with another set of holes in the cabinet portion, with the holes being configured to receive fasteners such as screws and the like therein to retain the cover portion on the cabinet portion. In order to install such a cover portion on a cabinet portion, the technician is required to lift the cover portion and to manipulate it into a position aligned with the cabinet portion, with the holes on the cover portion being aligned with the corresponding holes on the cabinet portion. After alignment has been achieved, the technician must install the fasteners in the aligned holes of the cover portion and the cabinet portion while maintaining such alignment. Depending upon the size of the electrical enclosure and other considerations, the cover portion can be heavy and difficult to manipulate, which makes alignment of the holes in the cover portion with those of the cabinet portion difficult and makes even more difficult the retention of the cover portion in such a position to enable installation of the fasteners into the holes. Moreover, most electrical enclosures are installed at roughly chest height, at which height a relatively tall cover portion can become difficult to control. It thus would be desired to provide a solution to these and other problems.

SUMMARY OF THE INVENTION

In view of the foregoing, an improved support apparatus is usable with an electrical enclosure to provide support to retain a cover portion of the electrical enclosure in proximity to a cabinet portion of the electrical enclosure. The support apparatus includes a shank having a hook-shaped retention element situated at an end thereof that is configured to provide vertical support to the cover portion. The support apparatus can further include another hook-shaped retention element at an opposite end of the shank that is configured to rest upon an upturned lip of the cabinet portion, or the shank can potentially be affixed to the cabinet portion. Slots can additionally be provided in the cabinet portion, the cover portion, or both to additionally provide horizontal alignment of the cover portion with the cabinet portion.

In view of the foregoing, an aspect of the disclosed and claimed concept is to provide an improved support apparatus that is usable with an electrical enclosure to provide support to the cover portion and to thereby facilitate installation of the cover portion onto the cabinet portion.

Another aspect of the disclosed and claimed concept is to provide an improved electrical enclosure apparatus that includes an electrical enclosure and a support apparatus wherein the support apparatus facilitates installation of a cover portion of the electrical enclosure onto a cabinet portion of the electrical enclosure.

A further aspect of the disclosed and claimed concept is to facilitate the installation of a cover portion of an electrical enclosure onto a cabinet portion of the electrical enclosure to enclose exposed electrical conductors therein.

Accordingly, an aspect of the disclosed and claimed concept is to provide an improved support apparatus structured to be cooperable with an electrical enclosure having a cabinet portion and a cover portion, the cabinet portion having a base panel, a number of walls extending from a periphery of the base panel, and a number of upturned lips, at least a first upturned lip of the number of upturned lips extending from at least a first wall of the number of walls and being disposed opposite the base panel. the support apparatus can be generally stated as including a shank, a first retention element situated on the shank and being structured to be disposed on the at least first upturned lip, and a second retention element disposed on the shank, the second retention element being structured to receive an edge of the cover portion and to provide vertical support to the cover portion.

Another aspect of the disclosed and claimed concept is to provide an improved electrical enclosure, the general nature of which can be stated to include a cabinet portion, a cover portion structured to be situated on the cabinet portion, the cabinet portion having a base panel, a number of walls extending from a periphery of the base panel, and a number of upturned lips, at least a first upturned lip of the number of upturned lips extending from at least a first wall of the number of walls and being disposed opposite the base panel, the cabinet portion further comprising a support apparatus that comprises a retention element that is structured to receive an elongated edge of the cover portion and that is structured to provide vertical support to the cover portion, the support apparatus being co-formed with and extending away from at least one of a wall of the number of walls and an upturned lip of the number of upturned lips.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
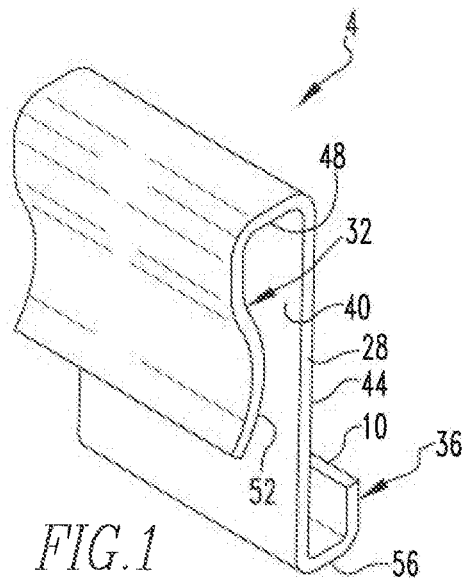
FIG. 1 is a perspective view of an improved support apparatus in accordance with a first embodiment of the disclosed and claimed concept.

An improved support apparatus 4 is depicted generally in FIG. 1 and is depicted at least in part in each of FIGS. 2-6. The support apparatus 4 is usable with an electrical enclosure 8 (FIG. 2) of a type having a cabinet portion 12, a cover portion 16, and a number of fasteners 20. As employed herein, the expression "a number of" and variations thereof shall refer broadly to any non-zero quantity, including a quantity of one. The fastener 20 are configured to attach the cover portion 16 to the cabinet portion 12 to provide an enclosed area within which exposed portions of a number of circuit interrupters (not expressly depicted herein) and a number of electrical conductors (not expressly depicted herein) are enclosed. The support apparatus 4 and the electrical enclosure 8 together can be said to form an improved electrical enclosure apparatus 24 in accordance with the disclosed and claimed concept.

As can be seen in FIG. 1, the support apparatus 4 can be said to include a plate-like shank 28, a first retention element 32 situated at a first end of the shank 28, and a second retention element 36 situated at a second, opposite end of the shank 28. The first and second retention elements 32 and 36 are generally hook-shaped and protrude in opposite directions from the shank 28. The shank 28 is plate-like, meaning that its width and length are substantially greater than its thickness, with the shank 28 having a first face 40 and a second face 44 that face in opposite directions. The first retention element 32 can be said to protrude in a direction generally away from the first face 40 and the second retention element 36 can be said to protrude in a direction generally away from the second face 44, whereby the first and second retention elements 32 and 36 protrude in opposite directions from the shank 28 at opposite ends thereof.

As can be understood from FIG. 1, the first retention element 32 can be said to include a support element 48 and an abutment element 52, with the support element 48 protruding from the shank 28, and with the abutment element 52 extending from the support element 48. In the depicted exemplary embodiment, the abutment element 52 has an indentation formed therein that is engageable with a portion of the cabinet portion 12, as will be set forth in greater detail below. In the depicted exemplary embodiment, the support element 48 is oriented substantially perpendicular to the shank 28, although in other embodiments the orientation of the support element 48 with respect to the shank 28 and its shape can be different without departing from the present concept. The abutment element 52 overlies at least a portion of the shank 28.

As can further be seen in FIG. 1, the second retention element 36 includes a support element 56 that extends from the shank 28 and an abutment element 60 that extends from the support element 56. In the depicted exemplary embodiment, the support element 56 is slightly curved but extends generally perpendicularly from the shank 28. The abutment element 60 overlies at least a portion of the shank 28.

Figure 4:
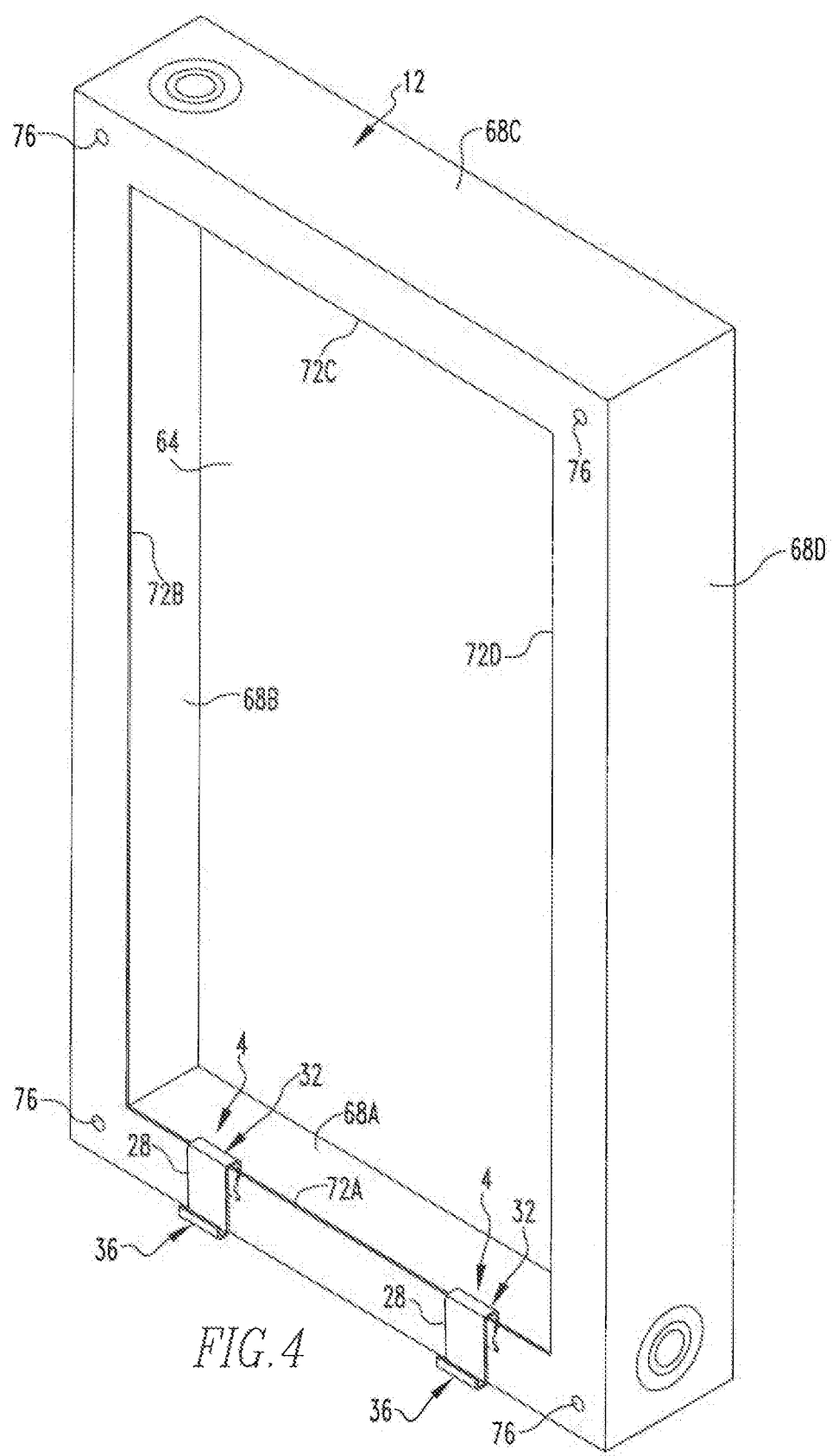
FIG. 4 is a perspective depiction of a cabinet portion of the electrical enclosure of FIG. 2 with a pair of the support apparatuses situated on an upturned lip of the cabinet portion.

As can be understood from FIG. 4, the cabinet portion 12 can be said to include a base panel 64, a plurality of walls 68A, 68B, 68C, and 68D that extend from a periphery of the base panel 64, and a set of upturned lips 72A, 72B, 72C, and 72D that extend from the walls 68A, 68B, 68C, and 68D, respectively, and that are situated opposite and overlying the base panel 64. As employed herein, the expression "upturned" is intended to refer to a formation methodology wherein one structure is formed to at least partially overlie another structure, and the "up" portion of the expression "upturned" is thus not intended to be limited to any "upward" direction or other direction. In the depicted exemplary embodiment, the upturned lips 72A, 72B, 72C, and 72D are oriented substantially perpendicular to the walls 68A, 68B, 68C, and 68D, and are oriented substantially parallel with and spaced apart from the base panel 64.

The cabinet portion 12 has a number of holes 76 formed therein, which, in the depicted exemplary embodiment, are each threaded to threadably receive one of the fasteners 20 therein. The holes 76 are depicted in FIG. 4 as being formed generally at the corners of the cabinet portion 12 and, more particularly, as being formed in the opposite ends of the upturned lips 72B and 72D. It is understood, however, that the holes 76 can be differently positioned without departing from the present concept, and the holes 76 likewise can be otherwise formed to cooperate with other types of fasteners without departing from the present concept.

The cover portion 16 is of a rectangular, plate-like configuration having a plurality of edges 80A, 80B, 80C, and 80D which together form the periphery of the cover portion 16. The cover portion 16 has a set of holes 84 formed therein that are alignable with the holes 76 in the cabinet portion 12 and which are structured to receive the fasteners 20 therethrough. The cover portion 16 additionally includes a door 88 that is openable to permit access by a user to the operating handles of the circuit interrupters that will be mounted within the electrical enclosure 8.

In use, the support apparatus 4 is employable to facilitate installation of the cover portion 16 to the cabinet portion 12 with the fasteners 20. While FIGS. 1-6 depict in an exemplary fashion a pair of the support apparatuses 4 being employed to support the cover 16 in proximity to the cabinet portion 12, it is understood that a greater or lesser number of the support apparatuses 4 can be employed depending upon the needs of the particular application.

In order to install the cover portion 16 on the cabinet portion 12, the support apparatuses 4 are received on the cabinet portion 12 by receiving the upturned lip 72A into the first retention element 32. Such a condition is depicted generally in FIG. 4 and results in a portion of the upturned lip 72A being disposed between the abutment element 52 and a portion of the shank 28 of each such support apparatus 4. The first retention element 32 may be configured to include a spring tang, as is depicted in FIG. 1, which compressively retains a portion of the upturned lip 72A between the abutment element 52 and the shank 28, although this is not strictly necessary in order to achieve the beneficial aspects of the disclosed and claimed concept.

The cover portion 16 is then received on the support apparatuses 4 by receiving the edge 80A or another appropriate edge of the cover portion 16 into engagement with the second retention element 36. In this regard, it can be seen that the first retention elements 32 face in a direction generally into an interior region of the cabinet portion 12 whereas the second retention elements 36 face in a direction generally opposite thereto, i.e., generally away from the cabinet portion 12, in a fashion that enables the cover portion 16 to be received on the second retention elements 36. In this regard, the support element 56 receives the edge 80A against it and allows for pivoting movement thereon of the cover portion 16 toward the cabinet portion 12. This enables a technician to hold the cover portion 16 at the edges 80B and 80D with the fingers wrapping around the edges 80B and 80D in order to receive the edge 80A on the second retention elements 36. The second retention elements 36 provide support to the cover portion 16 in a vertical direction from the perspective of FIGS. 5 and 6, and such vertical support permits the technician to detach the fingers from the edges 80B and 80D and then simply push the cover portion 16 toward and into proximity with the cabinet portion 12. In this regard, the expression "vertical" and variations thereof is intended to refer to a direction opposite the direction of acceleration due to gravity.

Figure 5:
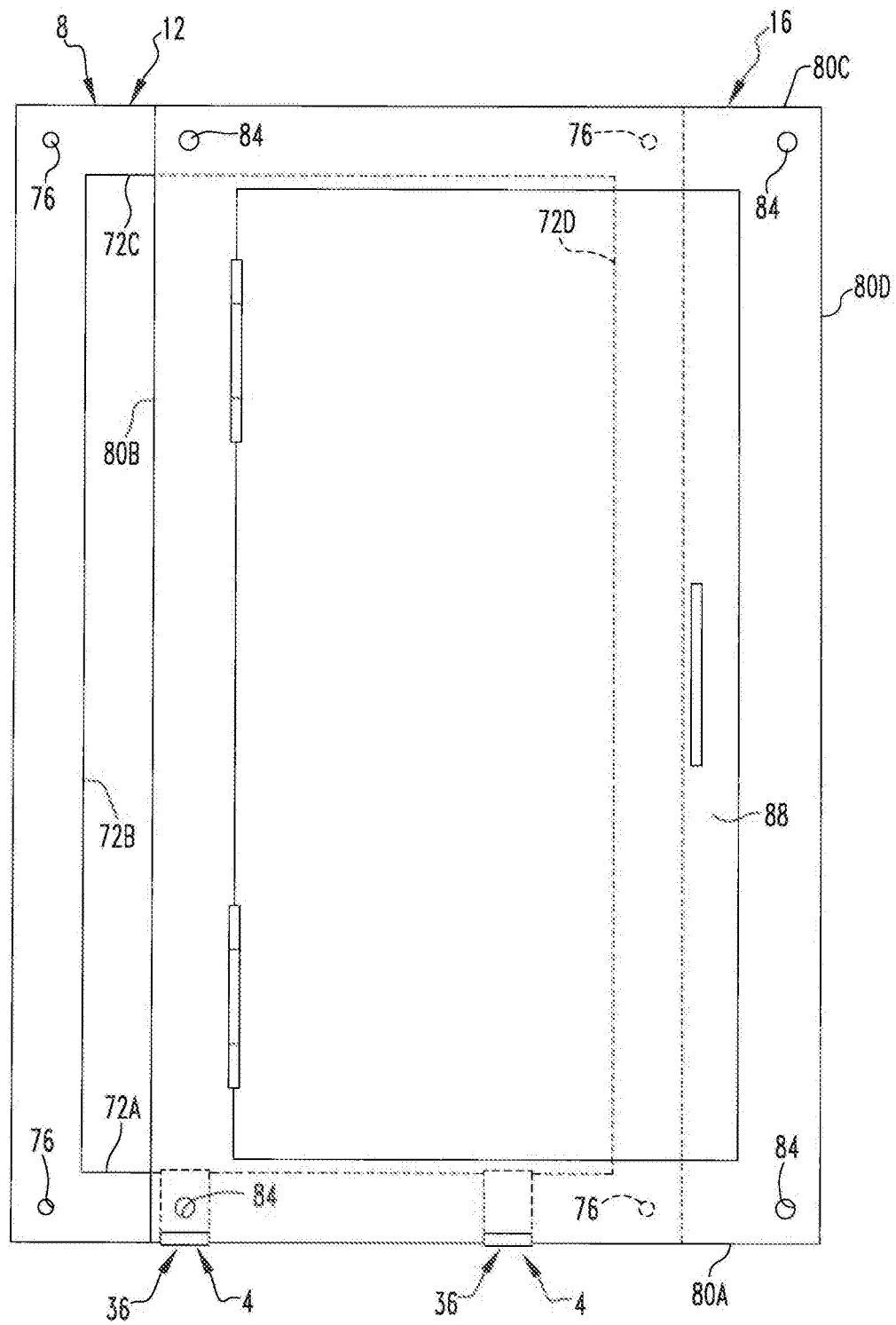
FIG. 5 is a front elevational view of a cover portion of the electrical enclosure of FIG. 2 being received on the pair of support apparatuses of FIG. 4 in a position vertically aligned with the cabinet portion.

The support apparatuses 4 provide not only vertical support to the cover portion 16 on the cabinet portion 12, but also provide vertical alignment of the holes 84 with the holes 76. That is, and as is indicated generally in FIG. 5, the support apparatuses 4 provide to the cover portion 16 support in a vertical direction from the perspective of FIGS. 5 and 6, meaning that the support apparatuses 4 retain the cover portion 16 in a given vertical position with respect to the cabinet portion 12. Such a given vertical position is one in which the holes 84 are aligned along the vertical direction with the holes 76. As can be seen in FIG. 5, the cover portion 16 is disposed on the support apparatuses 4 but is offset to the right from the cabinet portion 12. It can be seen in FIG. 5 that the holes 84 are offset in a horizontal direction from the perspective of FIG. 5, meaning that the holes 84 and 76 are at the same vertical position and are only spaced apart in a horizontal direction. As employed herein, the expression "horizontal" and variations thereof shall refer broadly to a direction that is generally orthogonal to the vertical direction.

Figure 6:
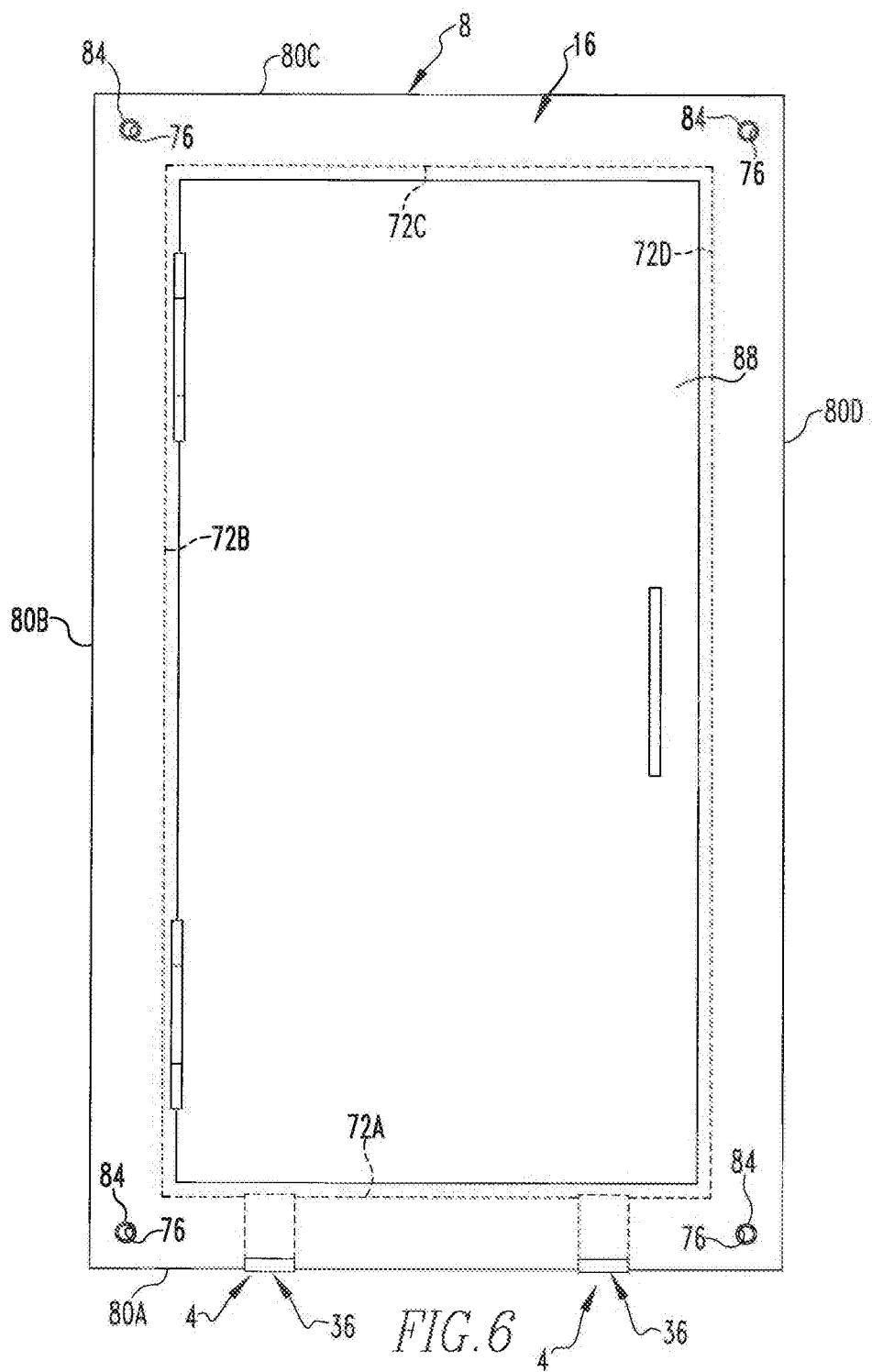
FIG. 6 is a view similar to FIG. 5, except depicting the cover portion translated in a horizontal direction from the perspective of FIG. 6 on the pair of support apparatuses to achieve horizontal alignment of the cover portion and the cabinet portion.

The cover portion 16 can then be translated on the support apparatuses 4 in the horizontal direction to order to additionally achieve horizontal alignment between the holes 84 and the holes 76. In FIGS. 5 and 6, the cover portion 16 is translated in a leftward direction on the support apparatuses 4 to achieve such alignment. Such translation of the cover portion 16 can be said to be in a direction parallel with the longitudinal extent of the edge 80A. The fasteners 20 can then be received in the holes 84 and the holes 76 in order to fasten the cover portion 16 to the cabinet portion 12.

Figure 3:
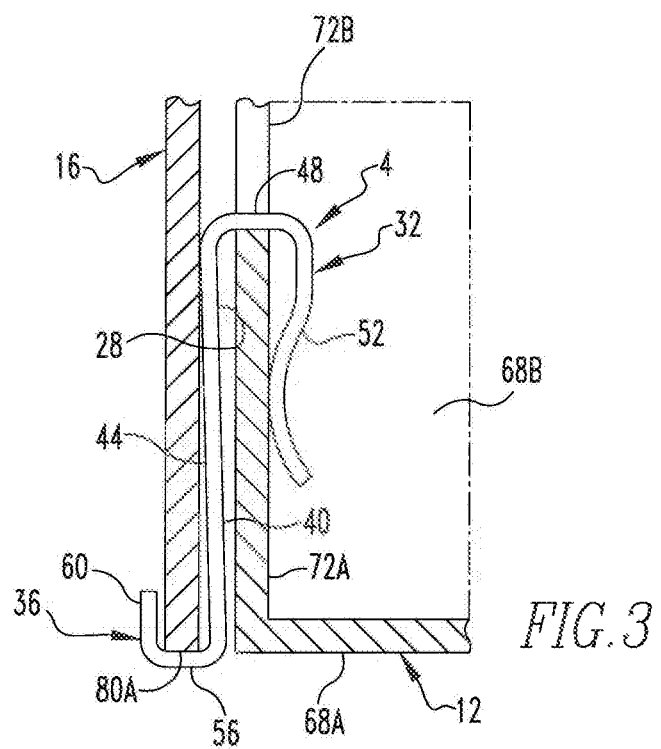
FIG. 3 is a sectional view as taken along line 3-3 of FIG. 2.

Since the electrical enclosure 8 is configured such that the holes 84 and 76 are aligned with another when the edges 80A, 80B, 80C, and 80D are aligned with the outermost surfaces of the walls 68A, 68B, 68C, and 68D, respectively, the support apparatus 4 is configured such that the upper surface from the perspective of FIG. 3 of the support element 48 is aligned with the outermost edge of the wall 68A in order to provide such alignment between the cover portion 16 and the cabinet portion 12. It thus can be seen that the support element 48 is situated generally lower than the outermost edge of the wall 68A when the cover portion 16 is installed on the cabinet portion 12.

Figure 2:
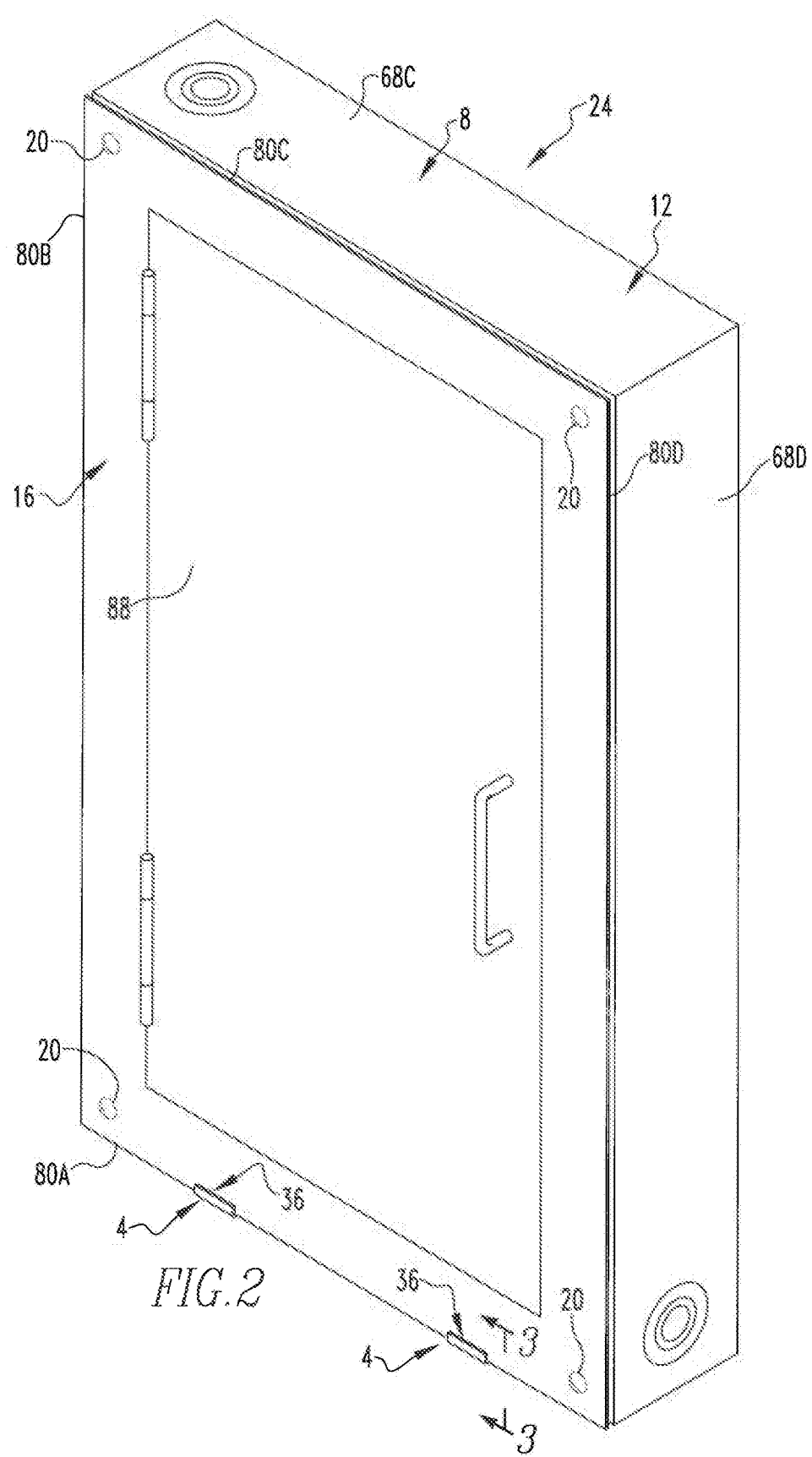
FIG. 2 is a perspective view of an improved electrical enclosure apparatus in accordance with the disclosed and claimed concept that includes an electrical enclosure and the support apparatus of FIG. 1.

It can also be seen that the support apparatuses 4 remain in the position depicted in FIGS. 2 and 3 after the cover portion 16 is attached to the cabinet portion 12 with the fasteners 20. That is, there is no need to attempt to remove the support apparatuses 4 from the electrical enclosure 8 after such assembly. Rather, the support apparatuses 4 stay in place to facilitate removal of the cover portion 16 from the cabinet portion 12 if it is ever needed. For example, once the fasteners 20 are removed from the holes 84 and 76, the support apparatuses 4 will provide support in the vertical direction with respect to FIGS. 5 and 6, thereby avoiding, for instance, dropping of the cover portion 16 as the last of the fasteners 20 is removed from the holes 84 and 76. The support apparatuses 4 thus advantageously facilitate assembly and disassembly of the electrical enclosure 8.

Figure 7:
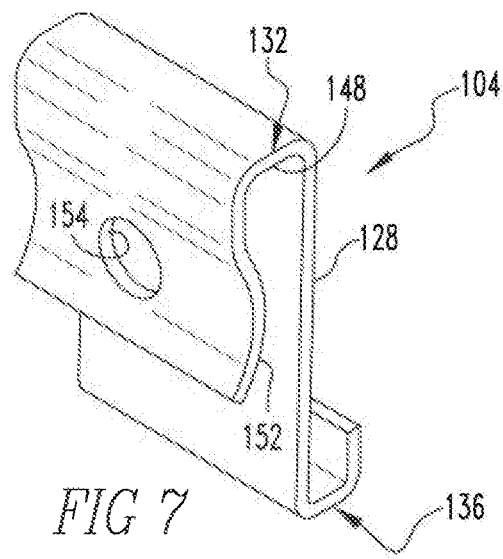
FIG. 7 is a perspective view of an improved support apparatus in accordance with a second embodiment of the disclosed and claimed concept.
Figure 9:
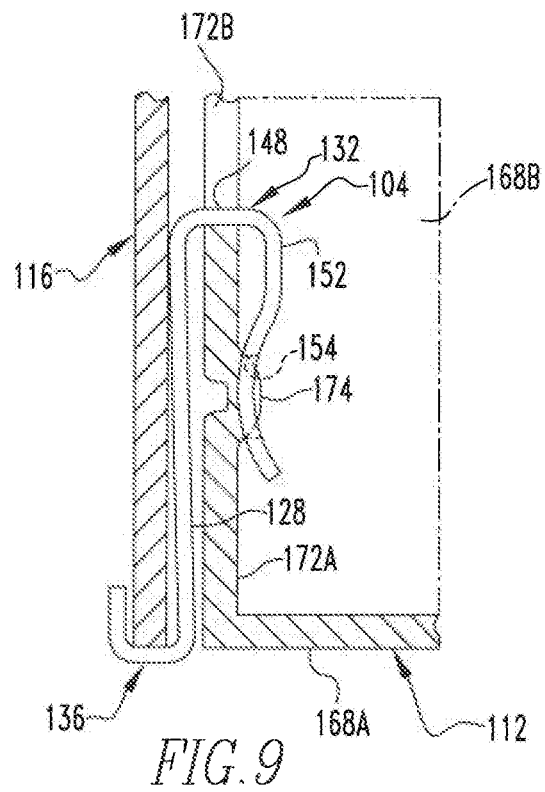
FIG. 9 is a sectional view as taken along line 9-9 of FIG. 8B.
Figure 8A:
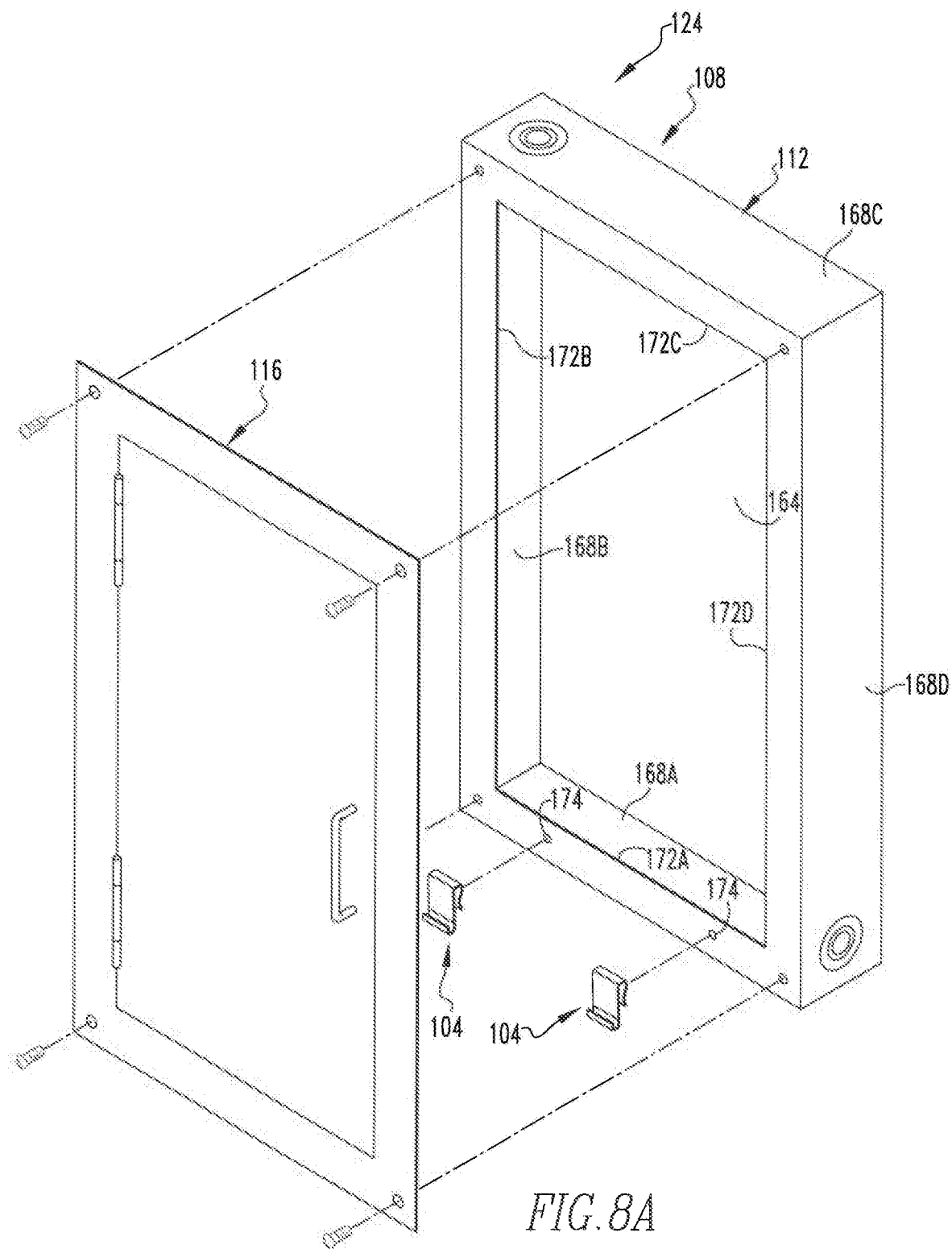
FIG. 8A is an exploded perspective view of an improved electrical enclosure apparatus in accordance with the disclosed and claimed concept having an electrical enclosure in accordance with the disclosed and claimed concept in combination with a pair of the support apparatuses of FIG. 7.
Figure 8B:
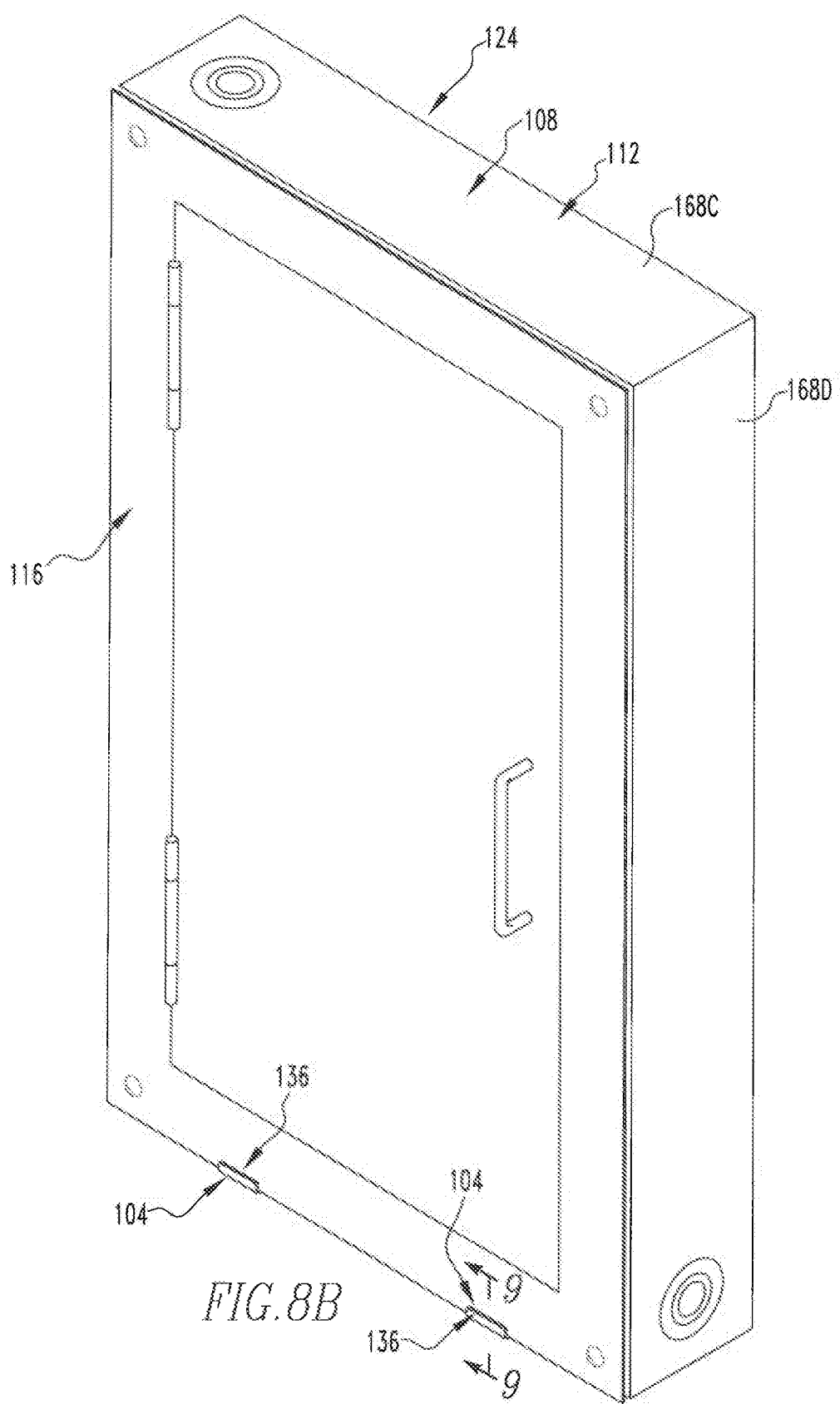
FIG. 8B is a view similar to FIG. 8A, except depicting a cover portion of the electrical enclosure situated on the pair of support apparatuses and installed on a cabinet portion of the electrical enclosure.

An improved support apparatus 104 in accordance with a second embodiment of the disclosed and claimed concept is depicted generally in FIG. 7 and is depicted at least in part in FIGS. 8A, 8B, and 9. The support apparatus 104 is employable in connection with an improved electrical enclosure 108 having a cabinet portion 112 and a cover portion 116 to result in an improved electrical enclosure apparatus 124 in accordance with the disclosed and claimed concept. The support apparatus 104 is similar to the support apparatus 4 in that it includes a shank 128, a hook-shaped first retention element 132 and a hook-shaped second retention element 136. As can be seen in FIG. 7, however, the first retention element 132 includes a support element 148 and an abutment element 152 wherein the abutment element 152 has a hole 154 formed therein. Moreover, the electrical enclosure 108 is similar to the electrical enclosure 8 in that the cabinet portion 112 includes a base panel 162 from the periphery of which a plurality of walls 168A, 168B, 168C, and 168D extend, and from which in turn extend a plurality of upturned lips 172A, 172B, 172C, and 172D, respectively. However, the upturned lip 172A additionally includes a number of dimples 174. Each dimple 174 is receivable in the hole 154 of one of the support apparatuses 104. As can be understood from FIG. 9, the dimples 174 protrude from the upturned lip 172A in a direction generally toward the interior region of the cabinet portion 112, although other dimples having other configurations can be employed without departing from the present concept.

As can be understood from FIG. 9, the support apparatuses 104 are received on the upturned lip 172A such that the dimples 174 are received in the holes 154, whereby the dimples 174 received in the holes 154 resist movement of the support apparatuses 104 in a direction parallel with the plane of the upturned lip 172A, i.e., in the vertical and horizontal directions and in directions therebetween. Such retention of the support apparatuses 104 in given positions on the upturned lip 172A prior to installation of the cover portion 116 on the second retention elements 136 facilitates assembly of the electrical enclosure 108 for a number of reasons. For instance, the technician who is handling the electrical enclosure 108 need not give consideration to where the support apparatuses 104 would most desirably be placed since the dimples 174 in the depicted exemplary embodiment are apparent from the front of the cabinet portion 112 as is depicted generally in FIG. 8A, and the dimples 174 establish the positions of the support apparatuses 104 on the cabinet portion 112. Also, the retention offered by the dimples 174 received in the holes 154 resists movement of the support apparatuses 104 on the upturned lip 172, such that if the cover portion 116 is inserted into one of the second retention elements 136 at an angle whereby the one of the second retention elements 136 is engaged by the cover portion 116 prior to engagement of the other second retention element 136, the one retention element 136 will be resisted from sliding along the upturned lip 172A. The dimples 174 thus provide horizontal support to the retention elements 136. Other advantages will be apparent to one of ordinary skill in the art.

It is also noted that the support apparatuses 104 can potentially be employed on the electrical enclosure 108 whereby the holes 154 will simply go unused, and the support element 148 received on the upturned lip 172A will still provide vertical support to the cover portion 116. In this regard, it is also noted that the support apparatus 4 can be employed on the electrical enclosure 108, for instance, by itself or in addition to the support apparatuses 104, such as if additional support of the cover portion 116 is needed. Moreover, the support apparatuses 104 could be used on the electrical enclosure 8, which does not include any such dimples. Again, while two of the support apparatuses 104 and an equal number of dimples 174 are depicted in the exemplary embodiment of the electrical enclosure apparatus 124, it is understood that a greater or lesser number can be employed without departing from the present concept.

Figure 10:
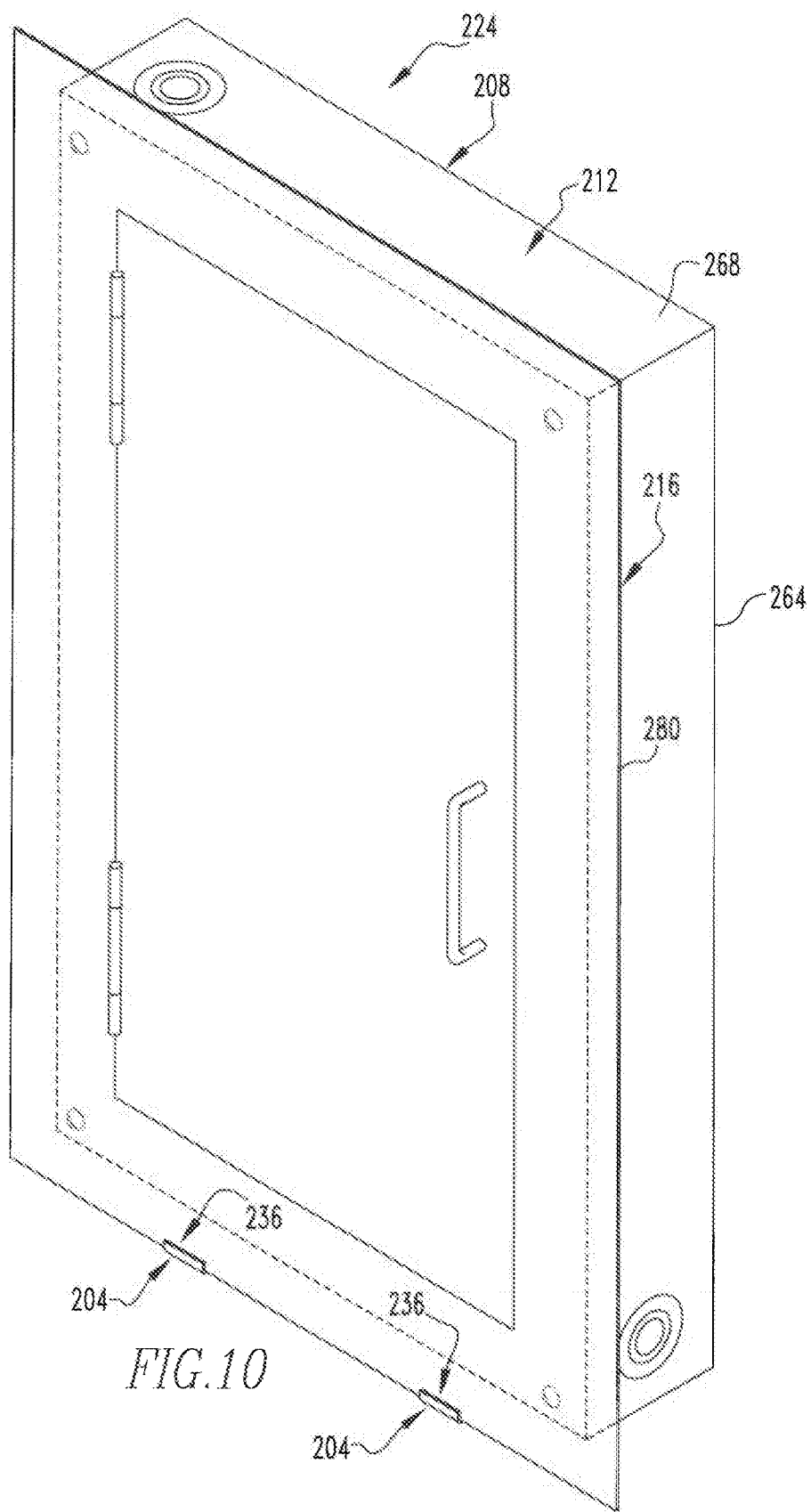
FIG. 10 is a perspective view of another electrical enclosure upon which an improved support apparatus in accordance with a third embodiment of the disclosed and claimed concept is situated.
Figure 11:
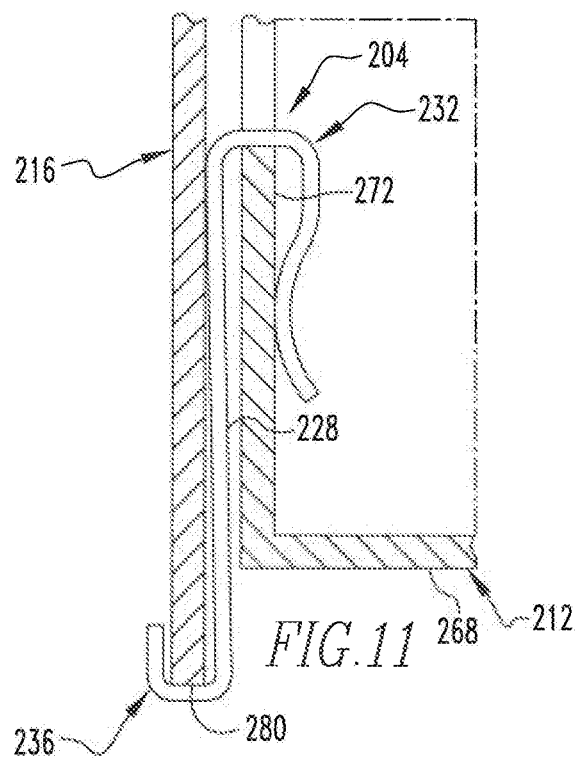
FIG. 11 is sectional view as taken along line 11-11 of FIG. 10.

An improved support apparatus 204 in accordance with a third embodiment of the disclosed and claimed concept is depicted generally in FIGS. 10 and 11. The support apparatus 204 is employable with an electrical enclosure 208 having a cabinet portion 212 and a cover portion 216 and which, when combined with the support apparatus 204, forms an improved electrical enclosure apparatus 224 in accordance with the disclosed and claimed concept. The electrical enclosure 208 is similar to the electrical enclosure 8 except that the cover portion 216 has a periphery 280 that extends, i.e., protrudes, beyond the cabinet portion 212 on all sides thereof. The cabinet portion 212 includes a base panel 264 from whose periphery extends a set of walls 268 and from which, in turn, extends a set of upturned lips 272. However, and as can be understood from FIGS. 10 and 11, the cover portion 216 installed on the cabinet portion 212 extends beyond the set of walls 268 to form a flange or escutcheon that is usable to serve as trim between the cabinet portion 212 and, for instance, a cavity in a structural wall of a building within which the cabinet portion 212 is installed.

In order to accommodate the greater distance between the set of walls 268 and the periphery 280 of the cover portion 216 that extends therepast, the support apparatus 204 is configured to include a shank 228 that is relatively longer than the shank 28. While the support apparatus 204 further includes a first retention element 232 and a second retention element 236, both of which are hook-shaped, the first and second retention elements 232 and 236 are positioned relatively farther away from one another than the first and second retention elements 32 and 36 since the shank 228 is relatively longer. The relatively longer shank 228 enables the support apparatus 204 to provide vertical support to the cover portion 216 to enable its installation on the cabinet portion 212 in substantially the same fashion as the support apparatus 4.

An improved support apparatus 304 in accordance with a fourth embodiment of the disclosed and claimed concept is depicted in use in conjunction with an improved electrical enclosure 308 (FIGS. 12-14) that is likewise in accordance with the disclosed and claimed concept. The support apparatus 304 is similar to the support apparatus 4, and the electrical enclosure 308 has similarities to the electrical enclosure 208 in that the electrical enclosure 308 includes a cabinet portion 312 and a cover portion 316 wherein the periphery of the cover portion 316 protrudes beyond the cabinet portion 312. Again, the support apparatus 304 and the electrical enclosure 308 can be said to together form an improved electrical enclosure apparatus 324.

The support apparatus 304 includes a shank 328, a first retention element 332, and a second retention element 336, all of which are similar to the shank 28, the first retention element 32, and the second retention element 36 of the support apparatus 4. However, the support apparatus 304 is cooperable with alignment structures that are formed on the cabinet portion 312 and the cover portion 316 in order to facilitate assembly of the electrical enclosure 308.

Figure 12:
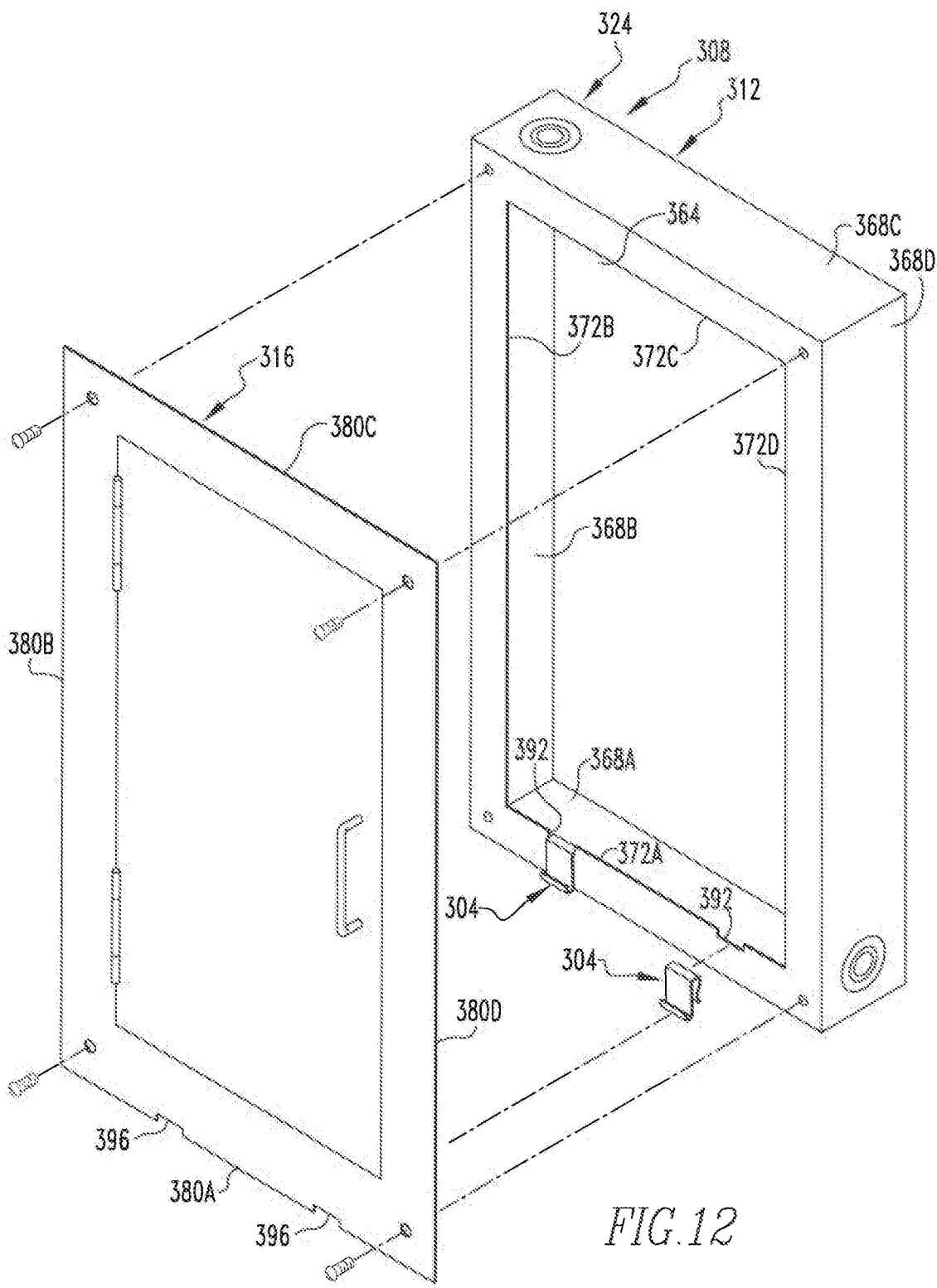
FIG. 12 is an exploded perspective view of an improved electrical enclosure apparatus in accordance with a fourth embodiment of the disclosed and claimed concept.

As can be understood from FIG. 12, the cabinet portion 312 includes a base panel 364 from whose periphery extend a plurality of walls 368A, 368B, 368C, and 368D from which, in turn, extend a plurality of upturned lips 372A, 372B, 372C, and 372D that are oriented parallel with and spaced from the base panel 364. The cover portion 316 includes a plurality of edges 380A, 380B, 380C, and 380D which protrude beyond the walls 368A, 368B, 368C, and 368D, respectively, when the cover portion 316 is attached to the cabinet portion 312.

It is noted, however, that the upturned lip 372A has a pair of notches 392 formed in an edge thereof, and the edge 380A of the cover portion 316 likewise has a pair of notches 396 formed therein. As can be understood from FIGS. 12-14, the notches 392 receive the first retention elements 332 therein and thus resist movement of the support apparatuses 304 in a direction parallel with the longitudinal extent of the upturned lip 372A.

Figure 14:
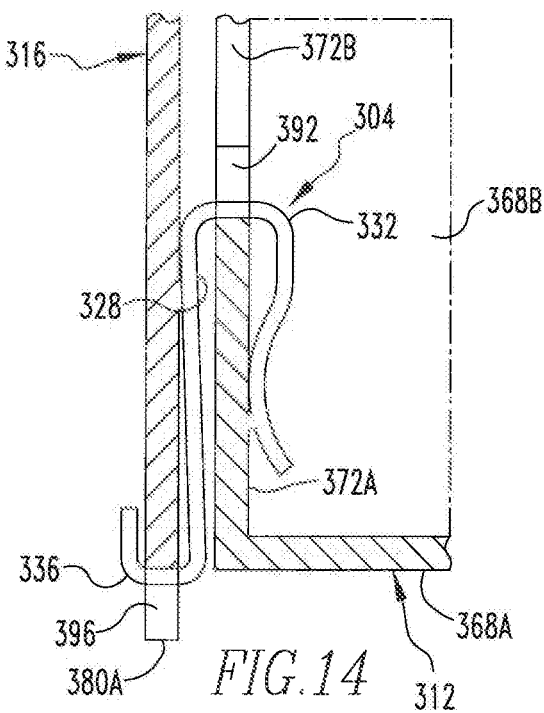
FIG. 14 is a sectional view as taken along line 14-14 of FIG. 13.
Figure 13:
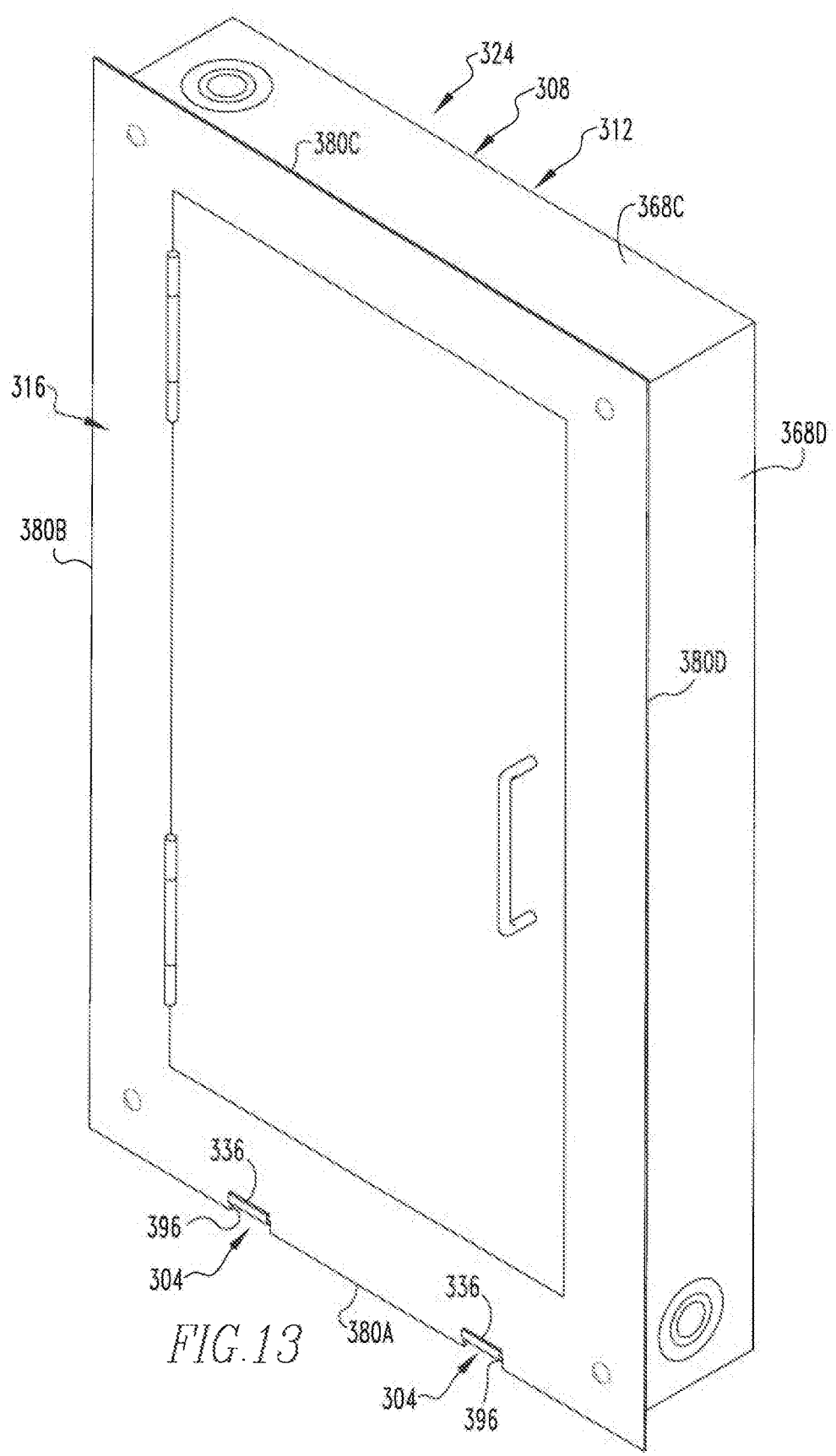
FIG. 13 is a view of the fourth embodiment of FIG. 12 in a partially assembled condition.

With the first retention elements 332 received in the notches 392, the cover portion 316 can be received on the second retention elements 336 whereby the support apparatuses 304 will provide vertical support to the cover portion 316 with respect to the cabinet portion 312. However, the second retention elements 336 are receivable in the notches 396 as is depicted in FIGS. 13 and 14. The reception of the second retention elements 336 in the notches 396 provides both vertical and advantageous horizontal alignment of the cover portion 316 with respect to the cabinet portion 312. Moreover, the second retention elements 336 received in the notches 396 resists movement of the cover portion 316 with respect to the cabinet portion 312 along a direction parallel with the longitudinal extent of the edge 380A. The support apparatuses 304 received in the notches 392 and 396 thus provide both vertical and horizontal retention and alignment, which further facilitates installation of the cover portion 316 on the cabinet portion 312. While, as set forth above, the electrical enclosure 308 is similar to the electrical enclosure 208, it is understood that the support apparatuses 304 can be employed with, by way of example, the electrical enclosure 8, although the shank would likely need to be shortened in order to provide alignment between the cover portion and the cabinet portion in the instance of notches being formed in both.

It is also noted that advantageous results can be obtained by providing only the notches 392 or only the notches 396, depending upon the needs of the particular application. It is also understood that the notches 392 could be replaced with, by way of example, the dimples 174 of the electrical enclosure 108. Other variations will be apparent. It is understood, however, that the vertical and horizontal support and alignment provided by the support apparatuses 304 received in the notches 392 and 396 facilitate installation the cover portion 316 on the cabinet portion 312.

Figure 15:
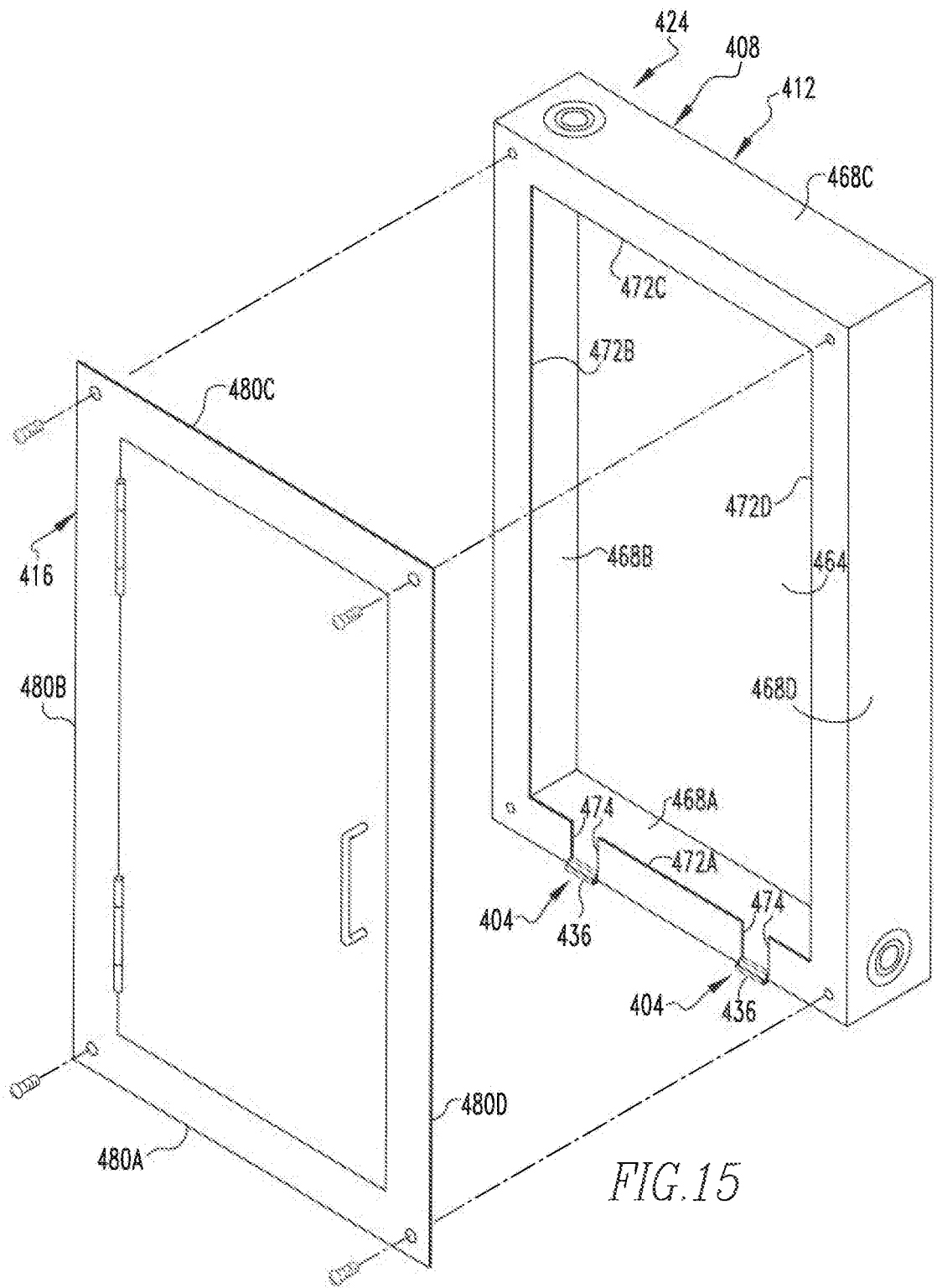
FIG. 15 is an exploded perspective view of an improved electrical enclosure apparatus in accordance with a fifth embodiment of the disclosed and claimed concept.
Figure 16:
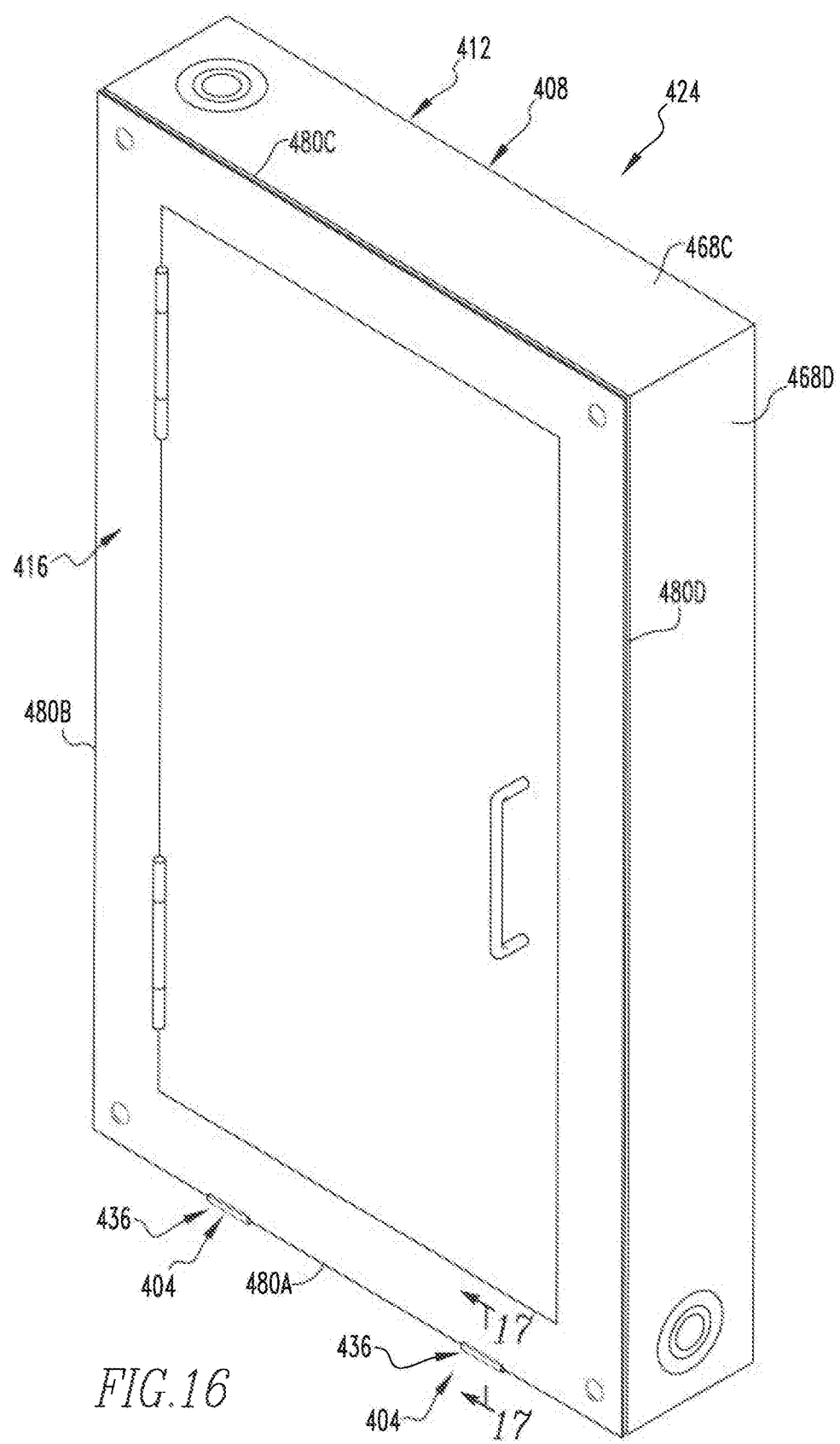
FIG. 16 is a perspective view of the fifth embodiment of FIG. 15 in an assembled condition.
Figure 17:
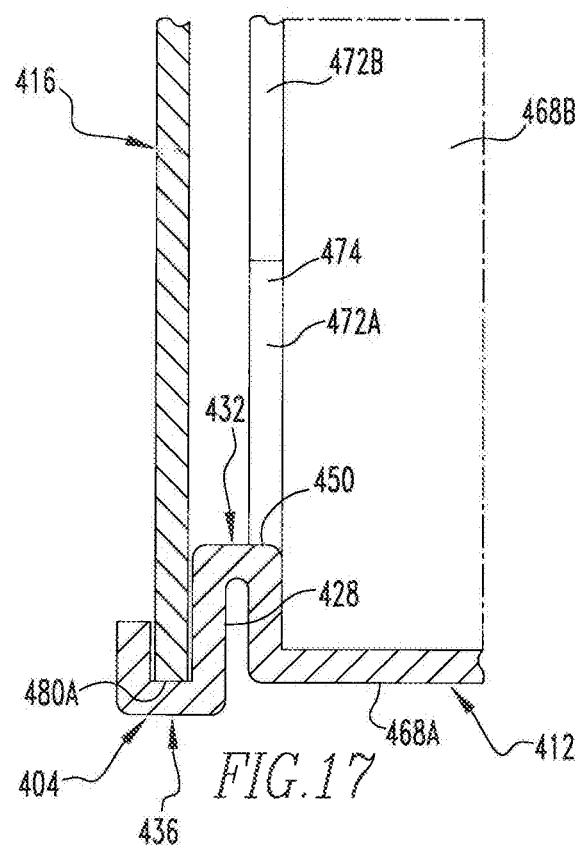
FIG. 17 is a sectional view as taken along line 17-17 of FIG. 16.

An improved support apparatus 404 in accordance with a fifth embodiment of the disclosed and claimed concept is depicted generally in FIGS. 15-17. In the depicted exemplary embodiment, the support apparatus 404 is a part of an electrical enclosure 408 which together form an improved electrical enclosure apparatus 424. More particularly, the electrical enclosure 408 includes a cabinet portion 412 and a cover portion 416. The cabinet portion 412 has a base panel 464 from which extend a plurality of walls 468A, 468B, 468C, and 468D and from which, in turn, protrude a plurality of upturned lips 472A, 472B, 472C, and 472D. However, instead of providing the support apparatus 404 as a component separate from the electrical enclosure 408, the support apparatuses 404 in the depicted exemplary embodiment are formed from the upturned lip 472A by forming in the upturned lip 472A a set of cuts 474 that serve to form a cutout region in the upturned lip 472A and that separate a portion of the upturned lip 472A from the remainder thereof, with the portion being bendable as indicated generally in FIGS. 15 and 17 to form the support apparatuses 404.

The support apparatuses 404 include a shank 428 that extends from and that is co-formed with the wall 468A or the upturned lip 472A or both. The support apparatus 404 can be said to include a first retention element 432, which is the portion of the support apparatus 404 that extends from the upturned lip 472A and/or the wall 468A, and further includes a second retention element 436 at an opposite end of the shank 428. The width of the cutout that is formed in the upturned lip 472A is roughly equal to the width of the support apparatus 404. The first retention element 432 can be said to include a connection element 450 that takes the place of the support element 48 and the abutment element 52 that are used in connection with the support apparatus 4. The connection element 450 is co-formed with the cabinet portion 412 and, by way of example, can be formed by forming the cuts 474 and bending the plate of material from which the cabinet portion 412 is formed to additionally form the support apparatuses 404. Nevertheless, other attachment methodologies such as welding, brazing, bolting, and the like can be employed without departing from the present concept.

In the depicted exemplary embodiment, the support apparatus 4 is formed from only a portion of the upturned lip 472A, meaning that the exemplary cuts 474 extend less than fully through the width of the upturned lip 472A and thus are spaced from the wall 468A. It is understood, however, that in other embodiments the upturned lip 472A can be cut to a greater extent if a larger support apparatus 404 is needed, such as in conjunction with an electrical enclosure such as the electrical enclosure 208. It is also understood that the cabinet portion 412 and specifically the support apparatuses 404 that are formed as a part thereof are cooperable with, by way of example, the cover portion 316 or the cover portion 16 depending upon the needs of the particular application.

By configuring the support apparatuses 404 to be affixed to the cabinet portion 412 and in the exemplary depicted embodiment co-formed therewith, the support apparatuses 404 are horizontally fixed with respect to the cabinet portion 412, such as in the fashion of the support apparatuses 104 engaged with the dimples 174 and the support apparatuses 304 received in the notches 392. The co-forming of the support apparatuses 404 with the electrical enclosure 408 enables a technician to easily install the cover portion 416 onto the cabinet portion 412 by receiving the edge 480A in the second retention elements 436 and by pivoting the cover portion 416 into proximity with the cabinet portion 412. The support apparatuses 404 provide vertical support in such a situation and enable facilitated horizontal and vertical alignment of the cover portion 416 with the cabinet portion 412. This facilitates assembly of the electrical enclosure 408.

It is emphasized that many of the features of the various embodiments set forth herein are employable in conjunction with other features of other embodiments set forth herein in virtually any combination. The various embodiments of the support apparatus 4, 104, 204, 304, and 404 thus advantageously facilitate assembly of the electrical enclosures 8, 108, 208, 308, and 408, which is desirable due to savings in money, time, and effort. Other advantageous will be apparent to one of ordinary skill in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electrical enclosure apparatus comprising:
   an electrical enclosure comprising a cabinet portion and a cover portion;
   the cabinet portion having a base panel, a number of walls extending from a periphery of the base panel, and a number of upturned lips, at least a first upturned lip of the number of upturned lips being elongated and extending from at least a first wall of the number of walls and being disposed opposite the base panel;
   the cover portion being planar in shape and having a plurality of edges which together form a periphery of the cover portion;
   a support apparatus comprising:
      a shank,
      a first retention element situated on the shank and being receivable on the at least first upturned lip, and
      a second retention element disposed on the shank, an edge from among the plurality of edges being elongated and being receivable on the second retention element to provide vertical support to the cover portion; and
   the at least first upturned lip having a notch formed therein that is structured to receive therein at least a portion of the first retention element and to resist movement of the support apparatus in a direction transverse to the longitudinal extent of the at least first upturned lip;
   the cover portion having another notch formed in the edge that is structured to receive therein at least another portion of the second retention element whereby the support apparatus is structured to position the cover portion in horizontal alignment with the cabinet portion and to resist movement of the cover portion in a direction transverse to the longitudinal extent of the edge.

2. The electrical enclosure apparatus of claim 1 wherein the cover portion comprises a number of fasteners, wherein an upturned lip of the number of upturned lips has a number of first holes formed therein, and wherein the cover portion has a number of second holes formed therein, at least some of the number of first holes and at least some of the number of second holes being aligned and being structured to receive therein a fastener of the number of fasteners when the at least a portion of the first retention element is received in the notch and when the at least a portion of the second retention element is received in the another notch.

* * * * *